Figure 1:
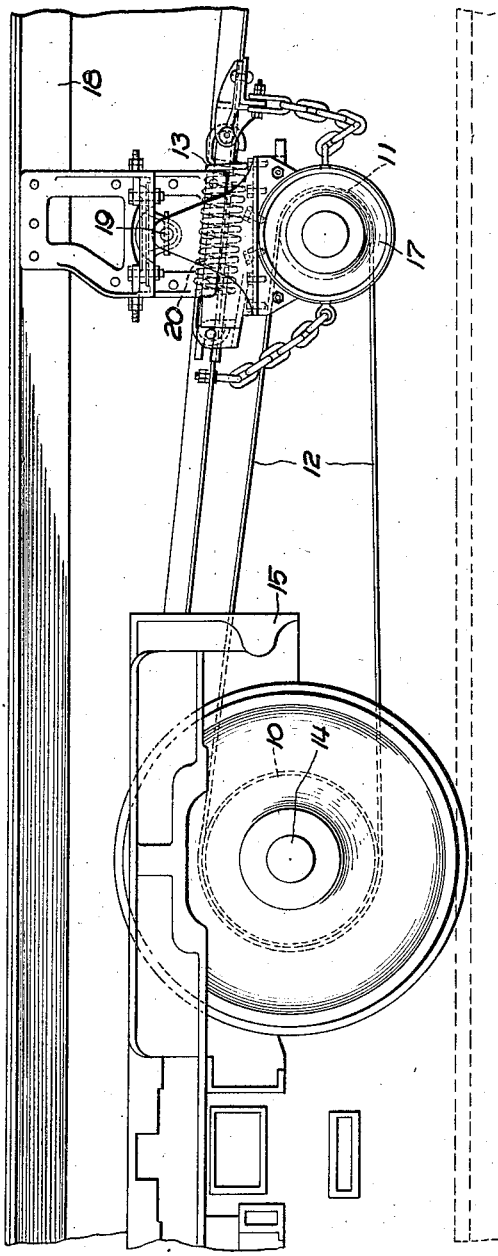

Nov. 27, 1923.

P. PARKE 1,475,241

DRIVING CONNECTION FOR RAILWAY CAR GENERATORS

Filed May 23, 1923    2 Sheets-Sheet 1

Nov. 27, 1923.

P. PARKE 1,475,241

DRIVING CONNECTION FOR RAILWAY CAR GENERATORS

Filed May 23, 1923    2 Sheets-Sheet 2

Witness:

Inventor
Peter Parke
By Cromwell, Greist & Warden
Attys

Patented Nov. 27, 1923.

1,475,241

UNITED STATES PATENT OFFICE.

PETER PARKE, OF CHICAGO, ILLINOIS, ASSIGNOR TO THE PULLMAN COMPANY, OF CHICAGO, ILLINOIS, A CORPORATION OF ILLINOIS.

DRIVING CONNECTION FOR RAILWAY-CAR GENERATORS.

Application filed May 23, 1923. Serial No. 640,819.

*To all whom it may concern:*

Be it known that I, PETER PARKE, a citizen of the United States, residing at Chicago, in the county of Cook and State of Illinois, have invented certain new and useful Improvements in Driving Connections for Railway-Car Generators, of which the following is a specification.

The invention relates to driving connections for railway car generators; and is particularly concerned with that type of connection which is intended to effect, with a belt and two spaced pulleys, a power transmission between a car axle and a car generator mounted in proximity to the axle on an associated car underframe—in which type of connection the median planes of the drive and driven pulleys are shifted arcuately out of alignment with each other whenever the car is travelling on a curve, and provision consequently must be made for maintaining the belt in operative engagement with the pulleys during this constantly occurring relative arcuate movement of their median planes.

Heretofore such a connection has ordinarily consisted of a highly flanged drive pulley on the axle, a highly flanged driven pulley on the generator, and a belt in engagement with the faces of the pulleys. This arrangement is unsatisfactory however for the reason that, if the flanges on the pulleys are made sufficiently high to prevent the belt from working itself thereover whenever the car is travelling on a curve and the median planes of the pulleys are consequently arcuately shifted relative to each other, the flanges will rub and wear against the edges of the belt, and this action, when continued for a short time, unavoidably results in frequent loss of belts, cessation of electrical generation for the car, and consumption of valuable time, labor and material in effecting belt replacements.

The invention accordingly has for its object the provision of an improved driving connection for axially-driven body-hung generators; which object is attained in the development and presentation of a novel drive pulley of crowned and axially elongated form. The form of the drive pulley is adapted to so affect the travel of the belt thereon that, when the median plane of the pulley is shifted arcuately relative to the median plane of the driven pulley, the tendency of the belt to ride down and off the near end of the drive pulley is counteracted to a certain extent by its tendency to ride up the crowned face of the drive pulley, and the belt is as a result maintained in substantially the median plane of the driven pulley under all operating conditions presented by the constantly occurring changes in the relative positions of the pulleys.

While the foregoing statement is indicative of the nature of the invention, other objects and advantages not herein specifically referred to will be appreciated upon a full comprehension of the novel features presented in the formation and manner of employment of the drive pulley.

In order that the invention will be readily understood, an exemplifying embodiment of the same is set forth in the accompanying drawings and in the following description based thereon. The invention is obviously susceptible of embodiment in other slightly varied structural formations without departure from the essence of the invention or the sacrifice of its material advantages; wherefore it is to be understood that the drawings and description are to be taken in an illustrative and not in any unnecessarily limiting sense.

Figure 2:
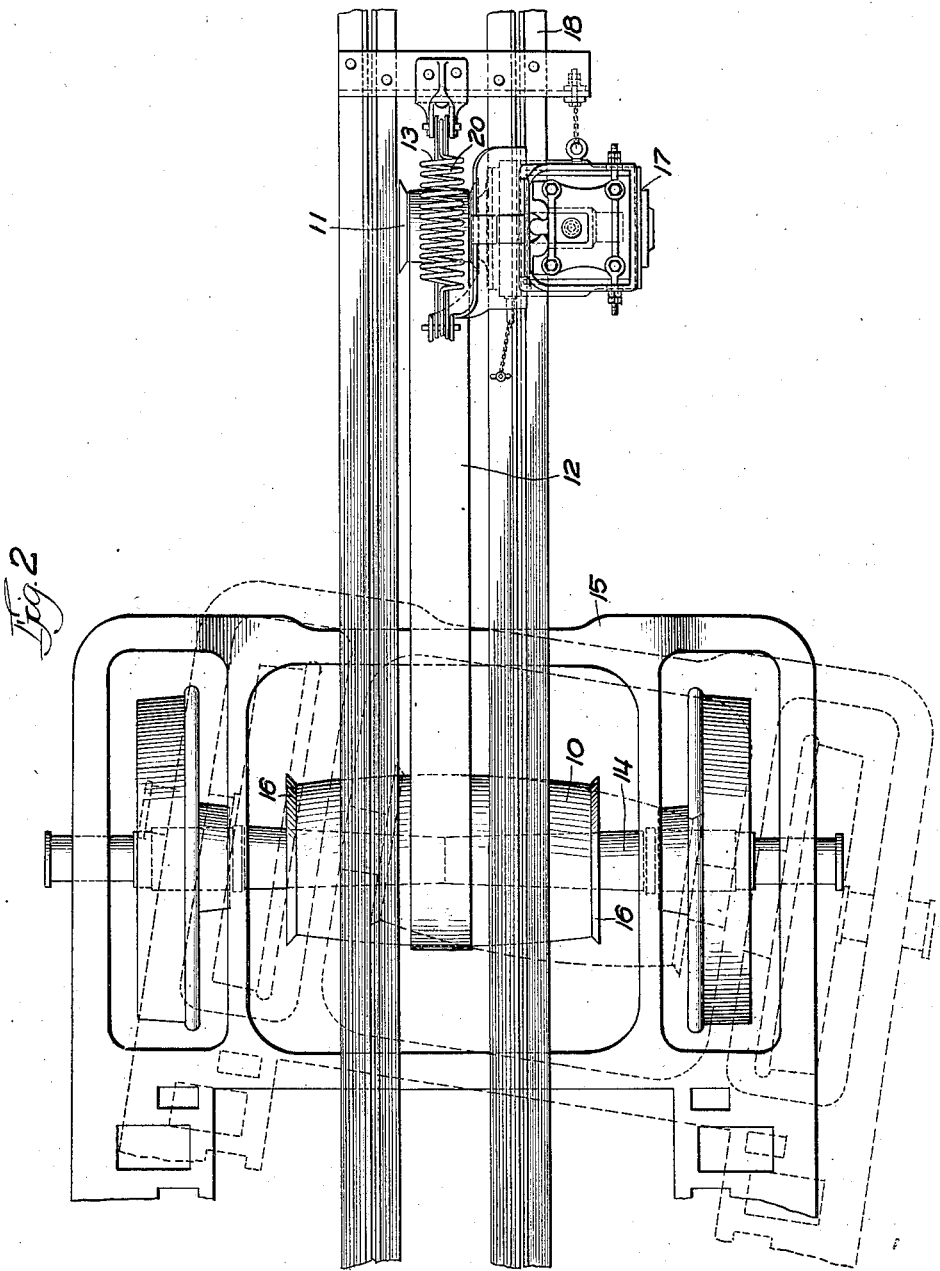

In the drawings,

Fig. 1 is a fragmentary side elevation of a railway car underframe and truck on which is mounted a generator provided with a driving connection embodying the invention; and Fig. 2 is a fragmentary plan view of the same, showing in dotted lines an extreme arcuately shifted position of the truck and its associated drive pulley relative to the underframe and its associated driven pulley and belt.

It will be observed that the driving connection of the invention is characterized by a drive pulley 10, a driven pulley 11, a belt 12 in engagement with the pulleys, and a belt-tensioning device 13 for moving the driven pulley bodily in its median plane.

The drive pulley 10 is mounted on an axle 14 of a car truck 15, and is crowned and axially elongated. The degree of the crowning and the amount of the elongation relative to the diameter may vary slightly in different arrangements, but the proportions in the particular pulley formation illustrated in Fig. 2 have been found to give very good results. The pulley may be provided with edge flanges 16 to prevent lateral slippage of the belt if for any reason the tension on the belt should decrease to an amount below that requisite for proper traction on the pulleys, but the flanges are not essential and the provision of the same is accordingly optional.

The driven pulley 11, which is preferably much smaller than the drive pulley 10, is mounted on a generator 17 suspended from a car underframe 18 which is swiveled at one end to the car truck 15. The pulley is preferably of the ordinary narrow flanged type.

The median planes of the drive pulley 10 and the driven pulley 11 are normally coincident with each other and with the longitudinal axes of the truck 15 and the underframe 18, but when the truck swivels relative to the underframe the median plane of the drive pulley 10 is shifted arcuately relative to the median plane of the driven pulley 11.

The belt 12 extends between and over the pulleys, and is adapted, when the median plane of the drive pulley is shifted arcuately relative to the median plane of the driven pulley, to shift axially of the drive pulley whereby to remain substantially in the median plane of the driven pulley while in continued operative engagement with the drive pulley.

The belt-tensioning device 13 includes a pivotal suspension of the generator on a transverse pin 19 at right angles to the median plane of the driven pulley, and a spring 20 acting to swing the driven pulley and the generator about the pin 19 in a direction away from the drive pulley. The purpose of the device is to keep the belt at the proper operating tension during variations in the distance between the pulleys caused by the relative arcuate shifting of their median planes.

The operation of the driving connection may be summarized as follows:

Whenever a railway car equipped with a generator suspended and driven in accordance with the invention is travelling on a tangent, the belt engages with the central face portion of the drive pulley, and, whenever the car is travelling on a curve and the median plane of the drive pulley is arcuately shifted relative to the median plane of the driven pulley, the belt rides down the incline presented by the drive pulley and continues operating upon the drive pulley in substantially the median plane of the driven pulley. The position which the belt assumes on the drive pulley is of course in a general way proportionate to the sharpness of the curve on which the car is travelling.

I claim:

1. In a belt-and-pulley power transmission wherein the median plane of one pulley is adapted to shift arcuately out of alignment with the median plane of the other pulley, a crowned pulley characterized by an axial length greater than its diameter.

2. In combination with an axle of a car truck and a generator hung from an associated car body, an axially elongated and crowned drive pulley operatively associated with the axle, a driven pulley operatively associated with the generator, and a belt on the pulleys.

3. In combination with an axle of a car truck and a generator hung from an associated car body, an axially elongated and crown drive pulley on the axle, a driven pulley on the generator, and a belt on the pulleys.

4. In combination with an axle of a car truck and a generator hung from an associated car body, a crowned drive pulley on the axle characterized by an axial length as great as its diameter, a driven pulley on the generator, and a belt on the pulleys.

5. In combination with an axle of a car truck and a generator hung from an associated car body, a crowned drive pulley on the axle characterized by end flanges and by an intervening axial length greater than its diameter, a driven pulley on the generator, and a belt on the pulleys.

6. In combination with an axle of a car truck and a generator hung from an associated car body, a crowned drive pulley on the axle characterized by an axial length greater than its diameter, a driven pulley on the generator, and a belt on the pulleys.

7. In combination with an axle of a car truck and a generator hung from an associated car body, an axially elongated and crowned drive pulley on the axle, a driven pulley on the generator, and a belt on the pulleys adapted to shift axially of the drive pulley without substantially changing its position relative to the median plane of the driven pulley.

8. In combination with the axle of a car truck and a generator hung from an associated car body, an axially elongated and crowned drive pulley on the axle, a driven pulley on the generator, a belt on the pulleys adapted to shift axially of the drive pulley without substantially changing its position relative to the median plane of the driven pulley, and means for moving the driven pulley bodily in its median plane to compensate for variations in the spacing of the belt engaging portions of the pulleys during the shifting of the belt on the drive pulley.

9. In combination with an axle of a car truck and a generator hung from an associated car body, an axially elongated and crowned drive pulley on the axle, a driven pulley on the generator, a belt on the pulleys adapted to shift axially of the drive pulley without substantially changing its position relative to the median plane of the driven pulley, and means controlled by the tension of the belt for moving the driven pulley bodily in its median plane to compensate for variations in the spacing of the belt engaging portions of the pulleys during the shifting of the belt on the drive pulley.

10. In combination with an axle of a car truck and a generator hung from an associated car body, a crowned drive pulley on the axle characterized by an axial length greater than its diameter, a driven pulley on the generator, a belt on the pulleys adapted to shift axially of the drive pulley without substantially changing its position relative to the median plane of the driven pulley, and means controlled by the tension of the belt for moving the driven pulley bodily in its median plane to compensate for variations in the spacing of the belt engaging portions of the pulleys during the shifting of the belt on the drive pulley.

In testimony whereof I have hereunto subscribed my name.

PETER PARKE.